Oct. 18, 1949.　　　J. L. AASLAND　　　2,484,802
STALK SHREDDING DEVICE

Filed Dec. 4, 1944　　　2 Sheets-Sheet 1

Inventor:
John L. Aasland,
By Paul O. Pippel
Attorney.

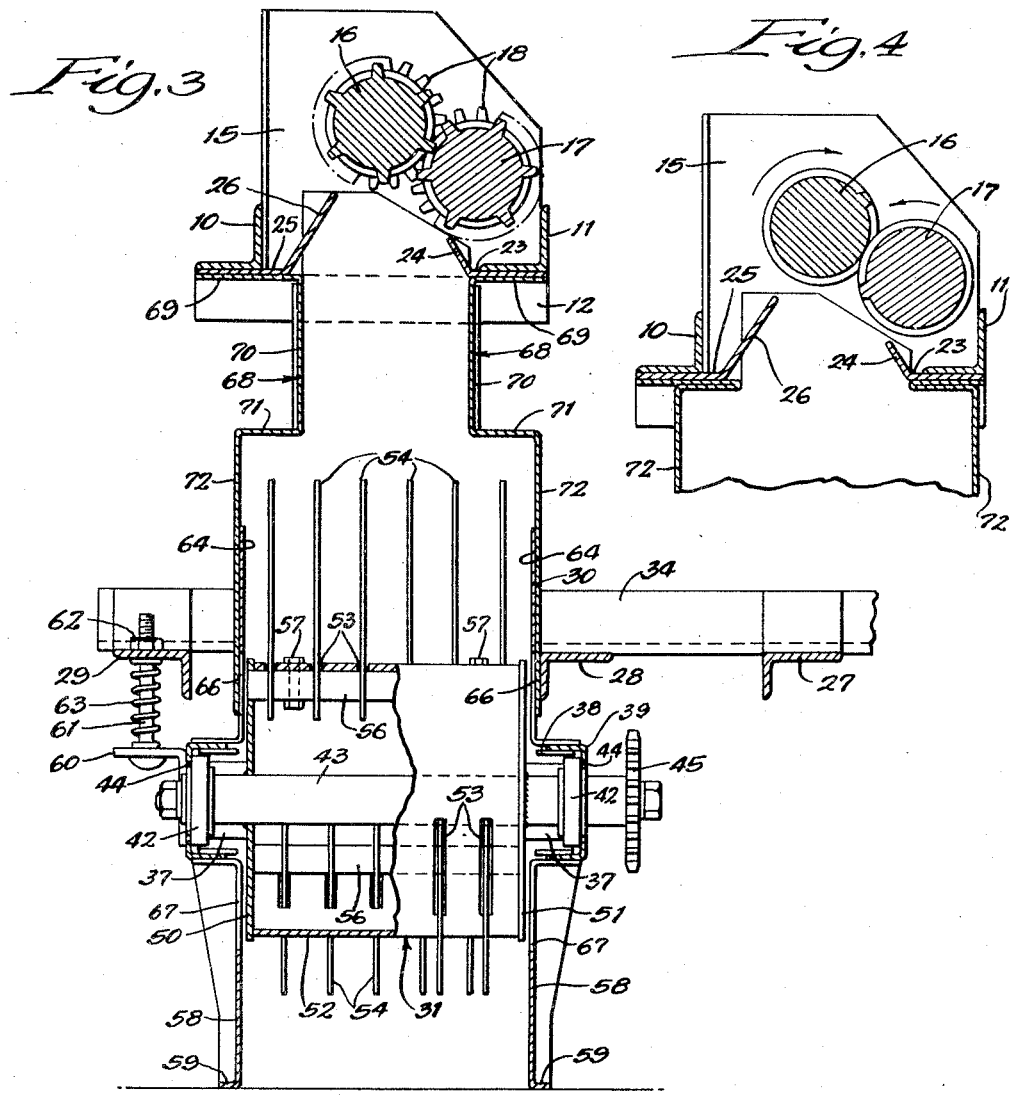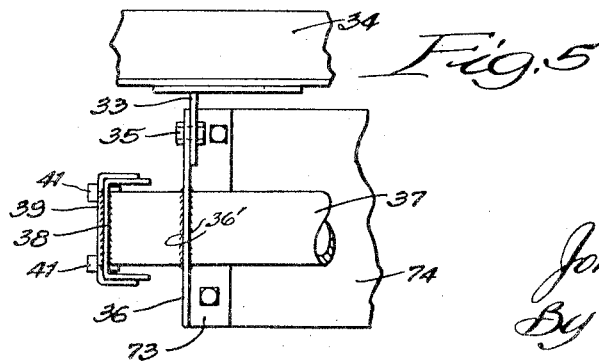

Patented Oct. 18, 1949

2,484,802

UNITED STATES PATENT OFFICE 2,484,802

STALK SHREDDING DEVICE

John L. Aasland, Moline, Ill., assignor to International Harvester Company, a corporation of New Jersey Application December 4, 1944, Serial No. 566,443

17 Claims. (Cl. 56—60)

This invention relates to a corn stalk shredding device. More specifically it relates to a stalk shredding attachment for corn pickers.

In recent years, the corn borer has spread to the extent that the yield of corn has been materially reduced in several sections of the country. One of the effective ways to reduce the spread of the corn borer and their number is to shred stalks after the corn has been husked. As a large percentage of the total corn crop is now picked by mechanical corn pickers, an attachment for corn pickers, which pulverizes the stalks after picking thereby destroying the corn borers contained therein, is an effective means of combating this pest. It is to an attachment of this type that the present invention is directed.

A principal object of the present invention is to provide a shredding attachment for corn pickers of the inclined snapping roll type.

Another principal object is to position a shredding attachment with respect to inclined snapping rolls and the ground, so as to receive and shred all of the stalks passing through the snapping rolls, as well as the portions of the stalks not engaged by the rolls.

Another object is to mount and operate a shredder attachment for corn pickers so as to completely shred the stalks down to the ground level.

Another principal object of the invention is to operate a rotating hammer type of shredder in a direction with respect to stalks being fed thereto and engaged thereby, so as to carry any unshredded portions of the stalks into shredding relation with a concave, whereby the said portions are completely shredded so as to effectively kill any corn borers contained therein.

The above objects and others, which will be apparent from the description to follow, are attained by a structure such as shown in the drawings, in which:

Figure 3 is a transverse section taken on the line 3—3 of Figure 1;

Figure 4 is a section taken on the line 4—4 of Figure 1; and

Figure 5 is a rear view of the shredder unit connecting bracket as shown in elevation in Figure 1.

Figures 1, 2:
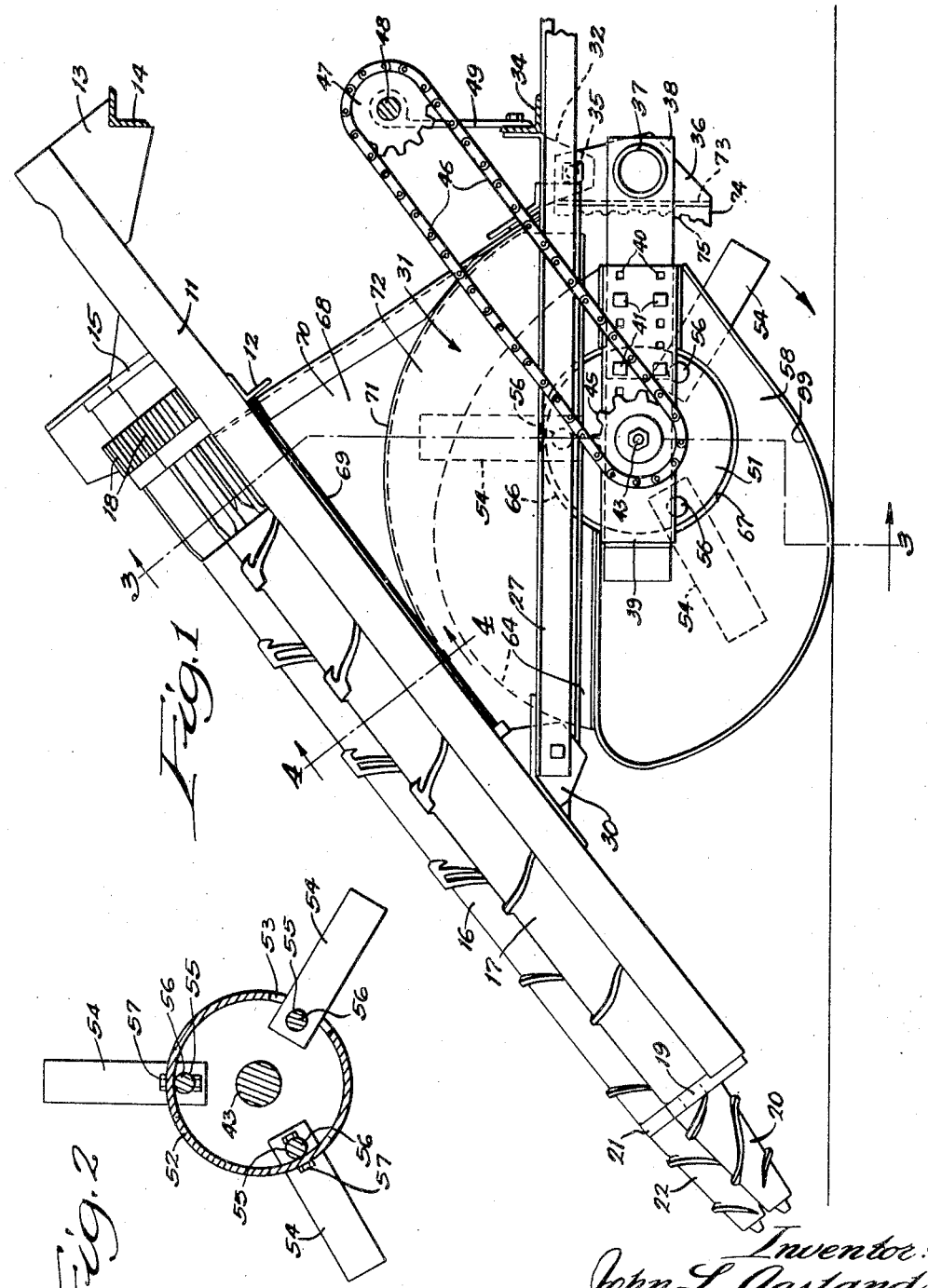
Figure 1 is a side elevation of a portion of a corn snapping device with the shredding device of the invention attached thereto.
Figure 2 is a section taken through the shredder unit at right angles to the axis.

Mechanical corn pickers, both of the horsedrawn type and the tractor-mounted type, have made wide use of inclined snapping rolls. Said rolls are carried by a mobile frame structure, stalks of corn being directed thereto by simple means. Power supplied to the rolls feed the stalks therebetween, snapping the ears when the stalk has passed through up to the points where the ears are attached. The drawings show only a portion of a corn picker frame structure and a pair of snapping rolls mounted thereon in addition to the shredding attachment of the invention. A complete corn picker of the inclined roll type is shown in U. S. Patent No. 2,255,168, September 9, 1941. In so far as this invention is concerned, it is only necessary to show the snapping rolls from which stalks are fed and the associated frame structure which supports the shredding attachment.

The corn picker structure, as shown in the drawings, includes inclined frame members 10 and 11 in the form of angle bars. Said bars are connected at their upper ends by a transverse angle bar 12. The bars 10 and 11 are also connected at their upper ends by brackets 13 to a transverse angle bar 14, which may serve as a means for connecting the picker structure to a tractor.

An upwardly projecting bracket structure 15, connected to the bars 10 and 11, provides means for rotatably supporting the upper ends of snapping rolls 16 and 17. Said rolls are connected by mating gears 18 at their upper ends, whereby they will be rotated in opposite directions. During snapping operation, the rolls are driven with the upper surfaces moving inwardly and downwardly closely adjacent each other as indicated in Figure 4, whereby stalks are fed between the rolls. When ears are encountered, they are snapped from the stalks, the remainder of the stalk being subsequently fed through the snapping rolls. The lower end of the snapping roll 17 is rotatably carried in a bracket 19, a live end portion 20 tapered in cross-section extending beyond the bracket 19. The snapping roll 16 is likewise supported in a bracket 21 carrying a live end-portion 22 beyond the bracket 21.

A deflector member 23, secured to the frame member 11 has a bent-up end-portion 24, lying adjacent the bottom portion of the snapping roll 17. A similar deflecting member 25, secured to the frame member 10, has an upwardly bent portion 26 terminating beneath the snapping roll 16. Said deflecting members act to direct the stalks passing through the snapping rolls downwardly and to the shredding mechanism as will be hereinafter described.

The frame structure of the corn picker as shown in the drawings, in addition to the frame members 10, includes spaced longitudinally extending frame members 27, 28, and 29 in the form of angle bars, the bar 28, as shown in Figure 3, being secured by a bracket structure 30 with the frame member 11.

The shredder unit, designated in its entirety by the reference character 31, is connected by brackets 32, and 33 one of which is shown in Figure 1 and one of which is shown in Figure 5, to the frame structure of the picker. A transverse frame member 34, shown in Figure 3 as connecting the angle bars 27, 28, and 29, forms a part of a bracing means for obtaining a rigid frame structure. The downwardly depending brackets 32 and 33 are provided with alined openings to provide a transverse axis on which the shredding unit is attached. The dotted lines in Figure 1 and full lines of Figure 5 show attaching bolts 35 by means of which brackets 36 are pivotally attached to the brackets 32 and 33. The brackets 36 are secured as by welding as indicated by reference character 36' to a transverse tubular member 37 which in turn is rigidly secured to spaced longitudinally extending channels 38 which form supporting means for the shredder unit. Another pair of channels 39 slidably fitted over the channels 38 provides extensible means for adjusting the location of the shredder unit as indicated by the openings 40 in Figure 1 and the bolts 41. It will be noted that the channels 38 and 39 may be secured together in a plurality of extended positions. As best shown in the broken-away part of Figure 3 at the left side thereof, each of the channels 39 provides a support for a bearing assembly 42. Said bearing assembly rotatably supports a shaft 43, an opening 44 in the channel permitting a portion of the shaft 43 to project therethrough. The construction at the other side is substantially the same, except that a driving sprocket 45 is secured to the extending end of the shaft 43. Said sprocket provides a source of power input, a driving chain 46 being indicated in Figure 1 as the source of power. Said chain also surrounds a sprocket 47 mounted on a shaft 48 carried by a bracket 49 secured to the frame structure of the picker. Power supplied to the shaft 48 drives the shredder shaft 43 in the direction indicated by the arrow in Figure 1.

Spaced circular end plates 50 and 51 rigidly secured to the shredder shaft 43 provide means for attaching a cylindrical wall 52. Said wall is provided with a plurality of axially alined slots 53 extending in a peripheral direction around the cylindrical wall. Shredder elements 54, extending through the slots 53, are provided with alined openings 55. A rod 56 extends through the openings in each set of shredder elements, said rods being held in position by bolts 57. As the centrifugal force of the shredder elements 54 operates to hold the shafts 56 against the inside of the wall 52, the bolts 57 take very little strain and are primarily for the purpose of maintaining the rods 56 in position. The slots 53 have sufficient circumferential extent to permit the shredder elements 54 to have the desired angular freedom in order to deflect when hard material or objects are encountered.

A gauge means in the form of sheet metal members 58 is connected to the bottom sides of the channels 39, as shown in Figures 1 and 3. Said members have inturned portions 59 shaped as curves of substantial radii extending forwardly and rearwardly with the lower point substantially below the axis of the shredder unit and somewhat forwardly thereof. The inturned portions 59 provide flanges which act as runners to gauge the position of the shredder unit with respect to the ground.

To position a shredder unit with respect to its attachment axis on the brackets 32 and 33 a connection is provided between the shredder unit and any forward portion of the frame member 29. An L-shaped bracket 60, connected to one of the channels 39, has its horizontal portion apertured to receive a bolt 61 which extends through an aperture in the frame member 29. A nut 62 on said bolt provides means for vertically adjusting the lowermost position of the shredder unit. A spring 63 surrounding the bolt acts to resiliently hold the shredder unit in a position determined by the bolt 62 while permitting resilient movement upwardly of the shredder unit. This resilient mounting is desirable to permit upward floating movement of the shredder unit when obstructions on the ground are encountered.

As shown in section in Figure 3 and in dotted lines in Figure 1, side shields 64 are connected to the upper sides of the channels 39. Said shields are generally semi-circular in shape and are cut out at their centers to provide openings 66 to prevent interference with the bolts 57 and to permit the removal of said bolts. It will be noted, also, that the sheet metal gauge members 58 are also cut out to provide openings 67 for the same purpose.

Stalk confining and directing means are provided for delivering the stalks to the shredder unit and confining them, whereby they will be efficiently directed to the shredding unit. The side walls 68 of the stalk directing means, as best shown in the section of Figure 3, each includes a horizontal portion 69, a vertical portion 70, an arcuate step portion or ledge 71, and a second vertical portion 72. The vertical portions 70 are spaced apart approximately the same distance as the lower ends of the upturned deflector elements 24 and 26. The vertical wall portions 72 are spaced apart a distance equivalent to the axial length of the shredder unit. Said wall portions overlap the shields 64 and are adapted to slidably engage said shields. The hinging of the shredder attachment on the brackets 33 and 34 together with the yielding connection provided by the bolt 61 and the spring 63 allows the shredder unit to move upwardly when high spots or obstructions are encountered. The overlapping relationship of the wall portions 72 with respect to the shields 64 permits this floating movement while maintaining a closed housing for delivering stalks from the snapping rolls to the shredder. The step wall portions 71 are arcuate in shape, as indicated in Figure 1, extending from a point adjacent the snapping rolls to a point adjacent the brackets 32 and 33.

The brackets 36 are angles and include inwardly turned flanges 73 which provide means for mounting a concave structure 74. Said structure has a plurality of ridged portions 75 on its forward faces to cooperate with the shredder elements 54 for completely reducing the stalks to small pieces or fine shreds.

In the operation of the shredding attachment, as above described in connection with a corn picker of the inclined snapping roll type, the shredder is driven at a high rate of speed by the chain 46. The shredder elements 54, during such operation, stand out in a radial position operating very much as the hammer elements in a conventional type of hammer mill. Sufficient of the elements 54 are provided to obtain the necessary shredding of the stalks for killing the corn borers. As the stalks are fed downwardly between the rolls 16 and 17, they are confined by the walls 70, 71, and 72 and must pass into the shredding zone defined by these walls. With the shredding unit rotated in the direction indicated, the stalks are shredded closely adjacent the ground level. Any portions of the stalks not reduced to small pieces are carried upwardly and over into the shredding zone as defined by the confining walls. All such material must then, along with the stalks being fed through the rolls, be passed over the concave 74. This action assures complete shredding of the stalks. It has been found by actual tests that a very high percentage of kill is obtained by all corn borers contained in stalks operated upon by a machine embodying an invention as described. The step wall portions 71 have a particular function in assisting to feed the material being shredded around the shredder unit and into the concave. If it were not for the provision of said step wall portions, there would be a tendency to throw all of the material upwardly toward the top of the snapping rolls. The arcuate wall portions 71 confine the material and direct it downwardly to the concave. The walls 70 are spaced apart only the distance required to permit the continued passage of stalks therebetween. The passage of stalks as forced down by the rolls through this confined space prevents the accumulation of excess material which might act to clog the machine.

The operation of applicant's improved stalk shredding attachment for corn pickers has been explained in connection with the description of the component parts thereof. All modifications falling within the scope of the appended claims are contemplated as a part of the invention.

What is claimed is:

1. A corn stalk shredding attachment for a corn picker of the type having a frame structure and inclined snapping rolls for removing ears of corn from standing stalks and passing the stalks downwardly therebetween, comprising a shredder frame adapted to be connected to the frame structure of the picker, a shredder unit rotatably mounted on said shredder frame and positioned beneath the snapping rolls in a manner to receive substantially vertically positioned stalks, and a shredding concave positioned in cooperating relationship with respect to the shredder unit.

2. A corn stalk shredding attachment for a corn picker of the type having a frame structure and inclined snapping rolls for removing ears of corn from standing stalks and passing the stalks downwardly therebetween, comprising a shredder frame adapted to be connected on a transverse axis to the frame structure of the picker, and a shredder unit rotatably mounted on said shredder frame and positioned substantially directly beneath the snapping rolls, a shredding concave carried by the shredder frame in cooperating relationship with respect to the shredder unit.

3. A corn stalk shredding attachment for a corn picker of the type having a frame structure and inclined snapping rolls for removing ears of corn from standing stalks and passing the stalks downwardly therebetween, comprising a shredder frame adapted to be pivotally connected on a transverse axis to the frame structure of the picker and extending forwardly from the axis under the snapping rolls, and a shredder unit rotatably mounted on said shredder frame, a shredding concave being positioned in cooperating relationship with respect to the shredder unit.

4. A corn stalk shredding attachment for a corn picker of the type having a frame structure and inclined snapping rolls for removing ears of corn from standing stalks and passing the stalks downwardly therebetween, comprising a shredder frame adapted to be pivotally connected on a transverse axis to the frame structure of the picker and extending forwardly from the axis under the snapping rolls, a shredder unit rotatably mounted on said shredder frame, a shredding concave positioned in cooperating relationship with respect to the shredder unit, and gauging runners secured to the shredder frame for gauging the position of the frame with respect to the ground level.

5. A corn stalk shredding attachment for a corn picker of the type having a frame structure and inclined snapping rolls for removing ears of corn from standing stalks and passing the stalks downwardly therebetween, comprising a shredder frame adapted to be connected to the frame structure of the picker, a shredder unit rotatably mounted on said shredder frame beneath the snapping rolls, and an enclosure extending from the snapping rolls to and around the shredder unit to provide a confined space for the passage of stalks thereto.

6. A corn stalk shredding attachment for a corn picker of the type having a frame structure and inclined snapping rolls for removing ears of corn from standing stalks and passing the stalks downwardly therebetween, comprising a shredder frame adapted to be pivotally connected on a transverse axis to the frame structure of the picker and extending forwardly from the axis under the snapping rolls, a shredder unit rotatably mounted on said shredder frame, a shredding concave positioned in cooperating relationship with respect to the shredder unit, gauging runners secured to the shredder frame for gauging the position of the frame with respect to the ground level, an enclosure extending from the snapping rolls to the shredder unit and adapted to be connected to the frame structure of the picker, and upwardly extending shields secured to the shredder frame in telescopic relation with said enclosure.

7. A corn stalk shredding attachment for a corn picker of the type having a frame structure and inclined snapping rolls for removing ears of corn from standing stalks and passing the stalks downwardly therebetween, comprising a shredder frame adapted to be connected to the frame structure of the picker, a rotatable shredder unit having a plurality of rows of pivoted shredder elements mounted on said shredder frame, said shredder unit being positioned below the snapping rolls with the shredder elements adjacent the ground level, whereby said shredder elements during rotation engage and shred stalks down to the ground level, means extending around the shredder unit and extending towards the snapping rolls for confining stalks to a shredding zone.

8. A corn stalk shredding attachment for a corn picker of the type having a frame structure and inclined snapping rolls for removing ears of corn from standing stalks and passing the stalks downwardly therebetween, comprising a shredder frame adapted to be pivotally connected on a transverse axis to the frame structure of the picker, a shredder unit having a plurality of rows of pivoted shredder elements mounted on said shredder frame, said shredder unit being positioned below the snapping rolls with the shredder elements adjacent the ground level, whereby said shredder elements during rotation engage and shred stalks down to the ground level, means extending around the shredder unit for confining stalks to a shredding zone, a concave positioned along the rear side of said deflector member, said concave having a shredder plate closely spaced with respect to the shredder elements whereby only shredded material may pass therebetween.

9. A corn stalk shredding attachment for a corn picker of the type having a frame structure and inclined snapping rolls for removing ears of corn from standing stalks and passing the stalks downwardly therebetween, comprising a shredder frame adapted to be pivotally connected on a transverse axis to the frame structure of the picker, a rotatable shredder unit having a plurality of rows of pivoted shredder elements mounted on said shredder frame, said shredder unit being carried by its frame in a position below the snapping rolls with the shredder elements adjacent the ground level, whereby said shredder elements during rotation engage and shred stalks down to the ground level, a means extending around the shredder unit for confining stalks to a shredding zone, a concave positioned along the rear side of said deflector member, said concave having a shredder plate closely spaced with respect to the shredder elements whereby only shredded material may pass therebetween, said shredder frame being resiliently held for floating movement in one direction with respect to the frame structure of the picker, and gauging runners secured to the shredder frame for gauging the position of the frame with respect to the ground level.

10. A corn stalk pulverizing attachment for a corn picker of the type having a frame structure and forwardly and downwardly inclined snapping rolls for removing ears of corn from standing stalks and passing the stalks downwardly therebetween, a shredder frame adapted to be pivotally connected on a transverse axis to the frame structure of the picker and extending forwardly therefrom under the snapping rolls, a rotatable shredder unit having a plurality of shredder elements mounted on said shredder frame, said unit being positioned below the snapping rolls and adjacent the ground level, whereby said shredder elements during rotation engage and shred stalks fed thereto from the snapping rolls and the standing stalks down to the ground level, a deflector structure extending from the snapping rolls to the shredder unit for confining stalks to a shredding zone, and a shredder concave positioned along the rear side of said deflector member, said concave having a shredder plate closely spaced with respect to the shredder elements whereby only shredded material may pass therebetween.

11. A corn stalk pulverizing attachment for a corn picker of the type having a frame structure and forwardly and downwardly inclined snapping rolls for removing ears of corn from standing stalks and passing the stalks downwardly therebetween, a shredder frame adapted to be pivotally connected on a transverse axis to the frame structure of the picker and extending forwardly therefrom under the snapping rolls, a rotatable shredder unit having a plurality of shredder elements mounted on said shredder frame, said unit being positioned below the snapping rolls and adjacent the ground level, whereby said shredder elements during rotation engage and shred stalks fed thereto from the snapping rolls and the standing stalks down to the ground level, a deflector structure extending from the snapping rolls to the shredder unit for confining stalks to a shredding zone, and a shredder concave positioned along the rear side of said deflector member closely spaced with respect to the shredder elements whereby only shredded material may pass therebetween, said shredder frame being resiliently held for floating movement in an upward direction with respect to the frame structure of the picker.

12. A corn stalk pulverizing attachment for a corn picker of the type having a frame structure and forwardly and downwardly inclined snapping rolls for removing ears of corn from standing stalks and passing the stalks downwardly therebetween, a shredder frame adapted to be pivotally connected on a transverse axis to the frame structure of the picker and extending forwardly therefrom under the snapping rolls, a rotatable shredder unit having a plurality of shredder elements mounted on said shredder frame, said unit being positioned below the snapping rolls and adjacent the ground level, whereby said shredder elements during rotation engage and shred stalks fed thereto from the snapping rolls and the standing stalks down to the ground level, a deflector structure extending from the snapping rolls to the shredder unit for confining stalks to a shredding zone, a shredder concave positioned along the rear side of said deflector member closely spaced with respect to the shredder elements whereby only shredded material may pass therebetween, said shredder frame being resiliently held for floating movement in an upward direction with respect to the frame structure of the picker, and gauging runners secured to the shredder frame for gauging the position of the frame with respect to the ground level.

13. A corn stalk pulverizing attachment for a corn picker of the type having a frame structure and forwardly and downwardly inclined snapping rolls for removing ears of corn from standing stalks and passing the stalks downwardly therebetween, comprising a rotatable shredder unit positioned below the snapping rolls adapted to be secured to the picker frame structure, a deflector structure extending downwardly from the snapping rolls and adjacent the shredder unit for confining stalks to a shredding zone, said structure including side walls stepped inwardly to form a stalk feeding throat substantially narrower than the width of the shredder unit, a concave positioned in cooperative relation with respect to the shredder unit.

14. A corn stalk pulverizing attachment for a corn picker of the type having a frame structure and forwardly and downwardly inclined snapping rolls for removing ears of corn from standing stalks and passing the stalks downwardly therebetween, comprising a rotatable shredder unit positioned below the snapping rolls adapted to be secured to the picker frame structure, a deflector structure extending downwardly from the snapping rolls and adjacent the shredder unit for confining salks to a shredding zone, said structure including side walls stepped inwardly to form a stalk feeding throat substantially narrower than the width of the shredder unit, a concave positioned in cooperative relation with respect to the shredder unit, said shredder unit being floatingly mounted adjacent the ground at the bottom of said deflector structure.

15. A corn stalk pulverizing attachment for a corn picker of the type having a frame structure and forwardly and downwardly inclined snapping rolls for removing ears of corn from standing stalks and passing the stalks downwardly therebetween, comprising a rotatable shredder unit positioned below the snapping rolls adapted to be secured to the picker frame structure, a deflector structure extending downwardly from the snapping rolls and adjacent the shredder unit for confining stalks to a shredding zone, said structure including side walls stepped inwardly to form a stalk feeding throat substantially narrower than the width of the shredder unit, a concave positioned in cooperative relation with respect to the shredder unit, said stepped side walls being shaped to cooperate with the shredder unit to form stalk forwarding means.

16. A corn stalk pulverizing attachment for a corn picker of the type having a frame structure and forwardly and downwardly inclined snapping rolls for removing ears of corn from standing stalks and passing the stalks downwardly therebetween, comprising a shredder frame adapted to be pivotally connected on a transverse axis to the frame structure of the picker, a shredder unit rotatably carried by said shredder frame in a position below the snapping rolls, a deflector structure extending downwardly from the snapping rolls and adjacent the shredder unit for confining stalks to a shredding zone, said structure including side walls stepped inwardly to form a stalk feeding throat substantially narrower than the width of the shredder unit and a back wall, and a concave positioned along the back wall of said deflector member in cooperative relation with respect to the shredder unit.

17. A corn stalk pulverizing attachment for a corn picker of the type having a frame structure and forwardly and downwardly inclined snapping rolls for removing ears of corn from standing stalks and passing the stalks downwardly therebetween, comprising a shredder frame adapted to be pivotally connected on a transverse axis to the frame structure of the picker, a shredder unit rotatably carried by said shredder frame in a position below the snapping rolls, a deflector structure extending downwardly from the snapping rolls and adjacent the shredder unit for confining stalks to a shredding zone, said structure including side walls stepped inwardly to form a stalk feeding throat substantially narrower than the width of the shredder unit and a back wall, a concave positioned along the back wall of said deflector member in cooperative relation with respect to the shredder unit, said shredder frame being resiliently held for vertical floating movement in one direction with respect to the frame structure of the picker, and gauging runners secured to the shredder frame.

JOHN L. AASLAND.

REFERENCES CITED

The following references are of record in the file of this patent:

UNITED STATES PATENTS

| Number | Name | Date |
|---|---|---|
| 604,528 | Gundersen | May 24, 1898 |
| 947,562 | Rosenthal | Jan. 25, 1910 |
| 1,117,314 | Blunck | Nov. 17, 1914 |
| 1,894,412 | Neighbour | Jan. 17, 1933 |
| 2,130,312 | Pickel | Sept. 13, 1938 |
| 2,302,973 | Sargent | Nov. 24, 1942 |